(12) United States Patent
Weber

(10) Patent No.: US 10,746,875 B2
(45) Date of Patent: Aug. 18, 2020

(54) SENSOR SYSTEM AND METHOD TO OPERATE A SENSOR SYSTEM

(71) Applicant: OSRAM Opto Semiconductors GmbH, Regensburg (DE)

(72) Inventor: Rolf Weber, San Jose, CA (US)

(73) Assignee: OSRAM OPTO SEMICONDUCTORS GMBH, Regensburg (DE)

( * ) Notice: Subject to any disclaimer, the term of this patent is extended or adjusted under 35 U.S.C. 154(b) by 200 days.

(21) Appl. No.: 15/699,647

(22) Filed: Sep. 8, 2017

(65) Prior Publication Data

US 2019/0079189 A1     Mar. 14, 2019

(51) Int. Cl.
| | | |
|---|---|---|
| *G01S 17/10* | (2020.01) | |
| *G01S 7/486* | (2020.01) | |
| *G01S 7/481* | (2006.01) | |
| *G01S 17/42* | (2006.01) | |
| *G01S 17/00* | (2020.01) | |
| *G01S 17/931* | (2020.01) | |

(52) U.S. Cl.
CPC ............. *G01S 17/10* (2013.01); *G01S 7/4811* (2013.01); *G01S 7/4814* (2013.01); *G01S 7/4816* (2013.01); *G01S 7/4818* (2013.01); *G01S 7/4868* (2013.01); *G01S 17/003* (2013.01); *G01S 17/42* (2013.01); *G01S 17/931* (2020.01)

(58) Field of Classification Search
CPC ........ G01S 7/486; G01S 7/4863; G01S 17/10; G01S 17/931; G01S 7/4811; G01S 7/4814; G01S 7/4816; G01S 7/4818; G01S 7/4858

USPC .............................................. 356/3.01–5.15
See application file for complete search history.

(56) References Cited

U.S. PATENT DOCUMENTS

| | | | |
|---|---|---|---|
| 6,181,062 B1* | 1/2001 | Hiraishi .............. | H01L 51/5281 313/504 |
| 6,350,976 B1* | 2/2002 | Higashino ................ | G01C 3/08 250/201.4 |
| 6,587,183 B1* | 7/2003 | Uomori .................. | G01B 11/25 348/E5.058 |
| 8,243,133 B1* | 8/2012 | Northcott ........... | G06K 9/00604 348/78 |
| 8,836,844 B2* | 9/2014 | Hiasa ..................... | G02B 7/346 348/340 |
| 9,094,594 B2* | 7/2015 | Kobayashi ............... | G01C 3/08 |
| 2008/0212838 A1* | 9/2008 | Frigerio ................ | G06K 9/209 382/107 |
| 2011/0007328 A1 | 1/2011 | Wolf et al. | |

(Continued)

FOREIGN PATENT DOCUMENTS

| | | |
|---|---|---|
| EP | 2910969 A1 | 8/2015 |
| JP | 2014071026 A | 4/2014 |

*Primary Examiner* — Luke D Ratcliffe
(74) *Attorney, Agent, or Firm* — Slater Matsil, LLP

(57) ABSTRACT

A sensor system and a method for operating a sensor system are disclosed. In an one embodiment, the sensor system includes a light source configured to emit laser radiation and an optical element configured to image the laser radiation to at least one image point at a fixed distance in an optical far field of the sensor system. A detector is configured to detect a proportion of the laser radiation reflected back at at least one object illuminated by the laser radiation. A pin hole is located in front of the detector, a diameter of the pin hole corresponds to a size of the image point within a factor of 2.

20 Claims, 6 Drawing Sheets

(56) References Cited

U.S. PATENT DOCUMENTS

| | | | | |
|---|---|---|---|---|
| 2011/0267508 A1* | 11/2011 | Kane | ............... | G06T 7/529 |
| | | | | 348/241 |
| 2012/0129579 A1* | 5/2012 | Tam | ............... | G01J 5/0025 |
| | | | | 455/575.1 |
| 2012/0287417 A1* | 11/2012 | Mimeault | ............... | G01C 3/08 |
| | | | | 356/5.01 |
| 2014/0078514 A1* | 3/2014 | Zhu | ............... | G01B 11/24 |
| | | | | 356/606 |
| 2016/0035099 A1* | 2/2016 | Kawamura | ............... | G06T 5/003 |
| | | | | 382/103 |
| 2016/0252619 A1* | 9/2016 | Markendorf | ............... | G01S 17/023 |
| | | | | 356/3.01 |
| 2017/0261318 A1* | 9/2017 | Takagi | ............... | G01C 3/085 |
| 2018/0101005 A1* | 4/2018 | Yamazoe | ............... | B60K 35/00 |

* cited by examiner

SENSOR SYSTEM AND METHOD TO OPERATE A SENSOR SYSTEM

TECHNICAL FIELD

The invention relates to a sensor system and a method for operating a sensor system.

SUMMARY

Embodiments provide a sensor system which can efficiently measure distances to objects at comparably large distances.

According to at least one embodiment, the sensor system comprises one or a plurality of light sources. The at least one light source is designed to emit laser radiation. The laser radiation is preferably of a fixed wavelength. As an alternative, the light source can be designed to produce laser radiation with a tunable wavelength or there can be different light sources having different emission wavelengths.

According to at least one embodiment, an optical element is to image the laser radiation to at least one image point at a fixed distance in an optical far field of the sensor system. That is, the light source is imaged at a fixed distance. The fixed distance is preferably constant and cannot be tuned. That is, the fixed distance is a distance that is immanent to the sensor system. For example, the fixed distance is between 150 m and 300 m, in particular around 250 m. If the sensor system is designed to be a scanning system, then there can be a plurality of image points corresponding to scanning directions, whereas in this configuration preferably all image points have a distance to the sensor system equal to the fixed distance. The term "image point" preferably relates to geometrical optics and not to wave optics. That is, the term "image point" can be an approximation in geometrical optics.

According to at least one embodiment, the sensor system comprises one or a plurality of detectors. The at least one detector is to detect a proportion of the laser radiation that is reflected back at at least one object illuminated by the laser radiation. In other words, the light source emits the laser radiation that shines onto the object. A proportion of said laser radiation is then reflected back to the detector and is converted into electrical signals in the detector.

According to at least one embodiment, there is a pin hole in front of the detector. A diameter of the pin hole corresponds approximately to a size of the image point. Preferably, the size of the pin hole corresponds to the size of the image point within a factor of 5 or 2 or 1.5 or 1.2. The size of the image point is determined by the positional relation between the light source and the optical element. Hence, the size of the image point is a property immanent to the sensor system.

In particular, at the image point a beam diameter of the laser radiation is at a minimum, at a side of the optical element remote from the light source. Hence, the image point can be located in an image plane of the optical system defined by the light source and the optical element. Hence, the image point is independent of the object to be detected.

According to at least one embodiment, the image point at the fixed distance is permanently imaged onto at least one of the detector and the pin hole. This is achieved by the optical element or by a further optical element that is attributed to the detector. Thus, the detector as well as the at least one image point are located in image planes of the optical element or of the further optical element. Of course, the image planes are immanent properties of the optical system formed by the detector and the optical element or the further optical element. Preferably, a position of the light source, the detector, the optical element and, as an option, of the further optical element are not changed relative to one another in the intended use of the system. Thus, these components can be fixed components.

According to at least one embodiment, the detector is designed to measure a time-of-flight of the reflected laser radiation. By the time-of-flight measurement, an actual distance between the sensor system and the object can be determined. Thus, the detector preferably has a high temporal resolution to achieve a resolution in the distance measurement, for example, of 1 m or better or of 0.5 m or better.

In at least one embodiment, the sensor system comprises a light source to emit laser radiation and an optical element to image the laser radiation to at least one image point at a fixed distance in an optical far field of the sensor system. A detector is to detect a proportion of the laser radiation reflected back at at least one object illuminated by the laser radiation. A pin hole is located in front of the detector. The diameter of the pin hole corresponds to the size of the image point within a factor of 2. The image point at the fixed distance is permanently imaged onto at least one of the detector and the pin hole by the optical element or by a further optical element. The detector is to measure the time-of-flight of the reflected laser radiation.

Single-photon CMOS silicon photo-multipliers are powerful devices with a high amplification factor. Normally, they feature a multitude of small cells in the order of 10 µm×10 µm, whereas there can be several thousands of such cells. Such photo-multipliers can be manufactured using CMOS processes. However, due to their high amplification factor, by using an electron cascade effect each cell can be saturated by a single converted photon for a few nanoseconds. Therefore, high ambient light conditions can result in saturation conditions where every cell receives a constant stream of photons and an additional radiation cannot be detected from, for example, the light source.

Avalanche photo diodes can be used to process many photons at the same time, a photo current increases with the amount of photons. However, avalanche photo diodes are expensive and require a reverse voltage in the order of 100 V to 200 V, compared to voltages up to 30 V for silicon photo-multipliers, and their manufacturing process deviates from CMOS production.

In the sensor system described herein, in particular because of the pin-hole, single-photon CMOS silicon-based photo-multipliers can be used as a cost-efficient component for the detector. Hence, an efficient Lidar system can be realized.

Thus, preferably the sensor system comprises an infrared-emitting laser where the laser light is collimated to illuminate a target. The reflections of the laser light from the target are detected with a sensor where the sensor is preferably equipped with a narrow bandpass filter to reduce the influence of ambient light. The time between the laser light emission and detection is a direct measure for the target distance.

As an option, the passband of the bandpass filter can be made to be very narrow, in particular if the light source is temperature-stabilized in order to reduce a thermal wavelength drift of the light source. This is done, for example, with a thermoelectric cooler, TEC for short. Otherwise, the passband of the filter can be shifted so that the passband is adapted to the shifted laser wavelength.

The collimation of the laser radiation is such that the laser is imaged at the maximum applicable target distance of the system, for example, 300 m. This produces the smallest light spot possible at the maximum target distance resulting in the highest illumination level, for example, measured in $mW/cm^2$. The maximum target distance corresponds to the fixed distance. Thus, the sensor system comprises an optical element like a lens in front of the detector that corresponds optically to a lens assigned to the light source. In particular in the case that the lens attributed to the detector has the same focal length as the light source together with the optical element, the image from the laser spot at, for example, a distance of 300 m through the detector lens has the same size as an aperture of the laser, for example, around 0.2 mm. The image size of the laser spot on the target at the fixed distance actually stays around 0.2 mm. For other, shorter target distances the spot size at the target in not in focus and roughly decreases linear with target distance.

According to at least one embodiment, an angle between an optical axis of the light source and an optical axis of the detector is at least 0.3 mrad or 0.7 mrad or 1 mrad or 2 mrad. As an alternative or in addition, said angle is at most 15 mrad or 8 mrad or 5 mrad. Thus, the reflected light is imaged off-axis onto the at least one of the detector and the pin hole in particular when the object is nearer to the sensor system than the fixed distance. Thus, if the object is nearer than the fixed maximum distance, an image of the object in particular on the pin hole is not centered on the pin hole.

According to at least one embodiment, the detector is a single-photon CMOS silicon-based photo-multiplier with a plurality of pixels. For example, there are at least 100 pixels or 300 pixels and/or at most 10000 pixels or 2000 pixels or 600 pixels.

According to at least one embodiment, a distance between the pin hole and the detector amounts to at most 0.02% or 0.01% or 0.03% of the fixed distance. Thus, a distance between the pin hole and the detector is very small compared with the fixed distance.

According to at least one embodiment, the fixed distance is at least 100 m or 200 m or 300 m. As an alternative or in addition, the fixed distance is at most 1 km or 600 m or 400 m. The fixed distance is determined by the distance between the light source and the optical element and by the focal length of the optical element.

According to at least one embodiment, a peak wavelength of the laser radiation is at least 780 nm or 880 nm or 905 nm. As an alternative or in addition, the peak wavelength is at most 1.5 µm or 1.1 µm or 940 nm. Thus, the laser radiation can be near infrared radiation. As an alternative or in addition, the laser radiation can be spread over different spectral regions, for example, in the near ultraviolet spectral range and/or in the visible spectral range.

According to at least one embodiment, the sensor system further comprises at least one diffusor. The purpose of the diffusor or the diffusors is to scatter the laser radiation. The diffusor is preferably located between the detector and the pin hole. That is, the laser radiation reflected to the diffusor is strayed after passing the pin hole.

According to at least one embodiment, the diffusor increases a size of an illumination spot on the detector. For example, the illumination spot is increased to at least two times or five times or ten times the diameter of the pin hole. Thus, a plurality of pixels of the detector can be illuminated. Hence, saturation of the pixels of the detector can be avoided. The sensitivity of the detector in particular to the laser radiation can thus be increased.

According to at least one embodiment, the diffusor is of a material transparent to the laser radiation. The diffusor has a roughening preferably at a side facing the pin hole. Hence, the diffusor can be formed as a piece of milky glass, for example.

According to at least one embodiment, the sensor system further comprises at least one spectral filter. The spectral filter or the spectral filters is/are located in front of the detector, for example, between the detector and the pin hole and/or near or directly on a side of the pin hole facing the detector. Preferably, the passband of the filter can be adapted to a wavelength range of the laser radiation. Thus, the passband can have the same or a similar spectral width as the laser radiation. This is true, for example, with a tolerance of at most a factor of 5 or 2 of 1.5.

According to at least one embodiment, the laser radiation is spectrally stabilized and/or the passband is to be tuned to a spectral position of the laser radiation. For example, the spectral filter is a Fabry Perot-based device. A distance of the mirrors of the Fabry Perot-based device can be adjusted to match the peak wavelength of the laser radiation. Thus, ambient light or stray light can be significantly suppressed.

According to at least one embodiment, a focal length of the optical element and/or of the further optical element is at least $2\times10^{-5}$ or $5\times10^{-5}$ of the fixed distance. As an alternative or in addition, said focal length is at most $10^{-4}$ or $5\times10^{-4}$ or $10^{-3}$ of the fixed distance. Thus, the focal length of the at least one optical element is very small compared with the fixed distance.

According to at least one embodiment, the sensor system further comprises one or a plurality of scanner units. The at least one scanner unit is to scan a solid angle range with the laser radiation. Preferably, the solid angle range is located in a horizontal plane. Thus, the solid angle range can be a one-dimensional range.

According to at least one embodiment, the laser radiation is a pulsed radiation. For example, a pulse duration is at least 1 ns or 2 ns and/or at most 10 ns or 5 ns or 3 ns. A repetition rate of the pulsed laser radiation is preferably at least 1 kHz or 10 kHz or 100 kHz and/or at most 10 MHz or 1 MHz.

According to at least one embodiment, the fixed distance is not changed or not significantly changed by the scanner unit. Thus, the scanner unit only changes a direction of the laser radiation but not an image plane of the optical system formed by the light source and the optical element.

According to at least one embodiment, the sensor system further comprises one or a plurality of absorber layers. The at least one absorber layer is arranged on the detector. The absorber layer is to absorb a part of the laser radiation before reaching the detector. Thus, saturation of the detector can be prevented. The absorber layer is preferably arranged between the pin hole and the detector, particularly directly on the detector.

According to at least one embodiment, the absorber layer is limited to regions of the detector. Otherwise, the absorber layer can completely cover the detector, in a constant or in a varied thickness. For example, a central region of the detector is covered with the absorber layer wherein the central region is under the pin hole, along an optical axis of the detector. As an alternative, the absorber layer is arranged in an edge region of the detector, the edge region surrounds the central region, preferably all around.

According to at least one embodiment, the sensor system further comprises one or a plurality of baffles. The at least one baffle is located between the pin hole and at least one of the optical element and the further optical element. The baffle is to reduce stray light. Preferably, the baffle is of a material absorbent to the laser radiation as well as ambient light and/or stray light.

According to at least one embodiment, an opening in the baffle to be passed by the reflected laser radiation has a diameter which is between the diameter of the pin hole and five times or ten times or 20 times the diameter of the pin hole. For example, the baffle is located approximately in the middle between the optical element or the further optical element and the pin hole, along the optical axis of the detector.

According to at least one embodiment, the sensor system is designed to measure the distance to objects between 0.1% and 100% inclusive of the fixed distance. That is, the sensor system is designed to work for ranges in particular between a couple of meters and some 100 m, for example, between 0.3 m and 300 m.

Further, a method to operate such a sensor system is provided. Thus, features for the method are also disclosed for the sensor system and vice versa.

In at least one embodiment, the method is to operate the sensor system of one or of a plurality of the embodiments stated above in order to measure a distance between the sensor system and an object. In operation, the light source emits a pulsed laser radiation. The optical element images the laser radiation to at least one image point at a fixed distance in the optical far field. The detector detects a proportion of the laser radiation reflected back at the at least one object illuminated by the laser radiation, a position of the object is between the sensor system and the fixed distance. The image point at the fixed distance is permanently imaged onto at least one of the detector and the pin hole by the optical element or by the further optical element. The distance to the object is measured by the time-of-flight measurement of the reflected laser radiation.

BRIEF DESCRIPTION OF THE DRAWINGS

A sensor system and a method described herein are explained in greater detail below by way of exemplary embodiments with reference to the drawings. Elements which are the same in the individual figures are indicated with the same reference numerals. Relationships between the elements are not shown to scale, however, but rather individual elements may be shown exaggeratedly large to assist in understanding.

In the figures.

DETAILED DESCRIPTION OF ILLUSTRATIVE EMBODIMENTS

Figure 1A:
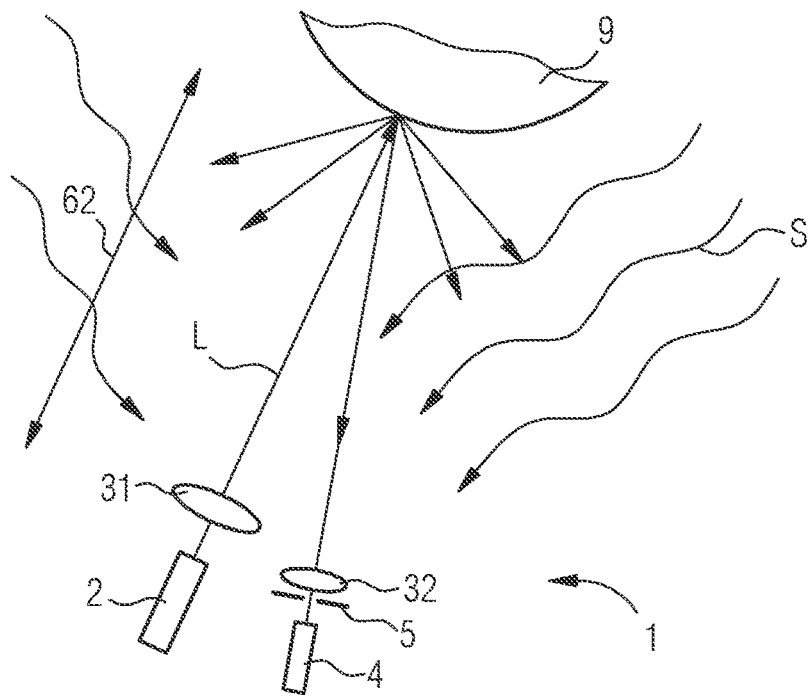
FIGS. 1A, 2A, 2B, 4, 5 and 9 show exemplary sectional representations of exemplary embodiments of sensor systems.
Figure 1B:
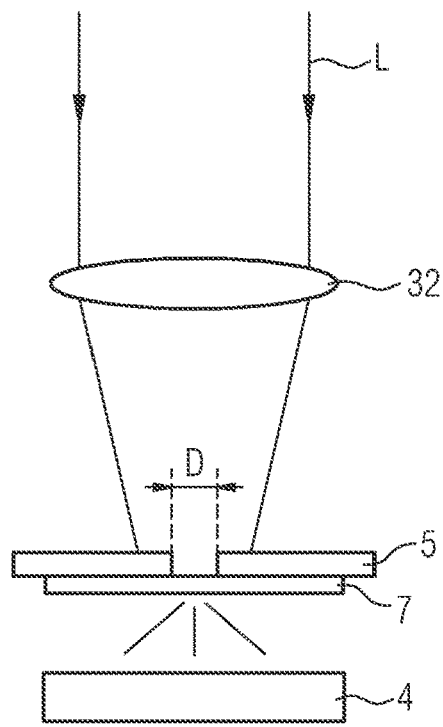
FIGS. 1B, 6, 7A, 7B, 7C, 7D and 8 show schematic sectional representations of exemplary embodiments of detectors and pin holes for sensor systems.

In FIG. 1A a sensor system 1 is illustrated. In FIG. 1B the arrangement around a detector 4 of the sensor system 1 is illustrated in more detail.

The sensor system 1 comprises a light source 2 which is preferably a laser that emits near infrared pulsed laser radiation L. The laser radiation L is imaged by a first optical element 31 into an image plane at a fixed distance 62. In the embodiment of FIG. 1, at the fixed distance 62 which is a maximum detection distance of the sensor system 1, there is an object 9, also referred to as target, to be detected. At the object 9, the laser radiation L is scattered and a part of the laser radiation L is strayed back in direction towards the detector 4. The latter portion of the laser radiation L is focussed onto a pin hole 5 which is located between a second optical element 32 and the detector 4. Moreover, there is stray light and ambient light S that could negatively influence the sensitivity of the sensor system 1.

In FIG. 1B it can be seen that the laser radiation L is focussed approximately on the pin hole 5 that has an opening with a diameter D. The diameter D is roughly smaller than a diameter of a spot of the laser radiation L on the pin hole 5. As an option, the pin hole 5 is followed by a diffusor 7. With the help of the diffusor 7, the light transmitted through the pin hole 5 is spread over a larger region on the detector 4.

Figure 2A:
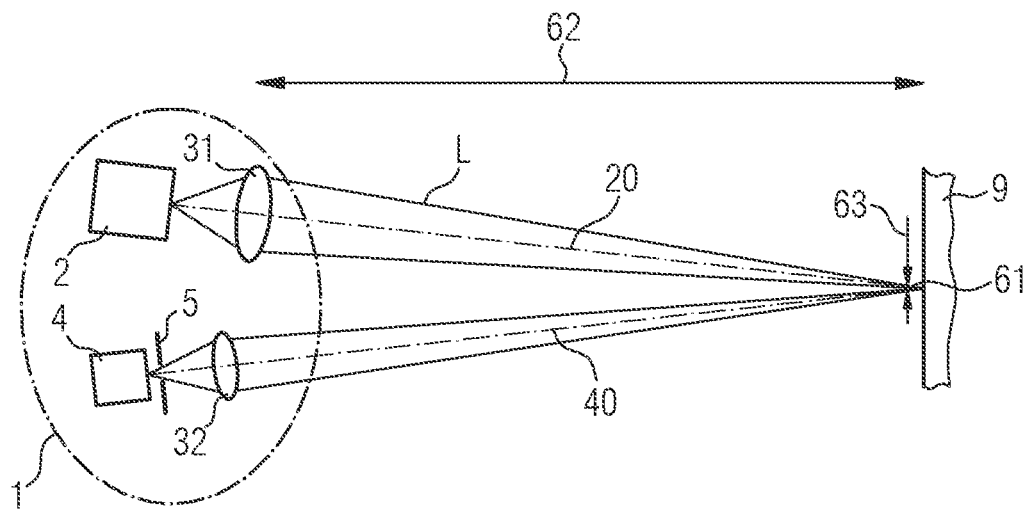

An exemplary embodiment of the sensor system 1 is also explained in connection with FIG. 2. According to FIG. 2A the object 9 is at the fixed distance 62. Thus, there is a minimum size 63 of an image point 61 of the laser radiation L. Thus, the light source 2 is imaged to the image point 61 at the fixed distance 62.

Moreover, from FIG. 2 it can be seen that the light source 2 has an optical axis 20 and the detector 4 has an optical axis 40. There is a small angle between these optical axes 20, 40.

Figure 2B:
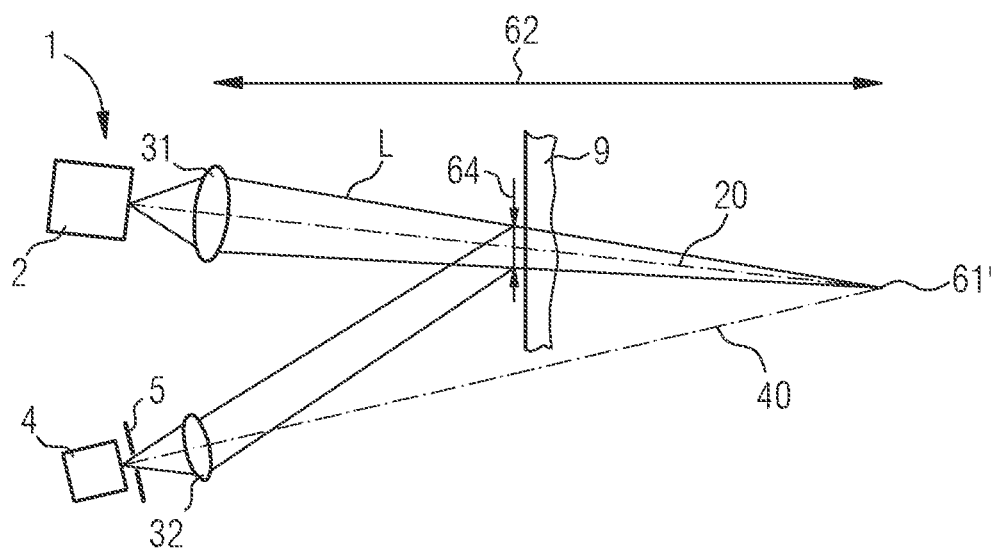

Thus, see FIG. 2B, if the object 9 to reflect the laser radiation L is located nearer to the light source 2, the size 64 of an illuminated area is larger than the size 63 of the image point. Moreover, a spot size of the spot of the reflected laser radiation L on the pin hole 5 is increased and is also located off-center.

Figure 3A:
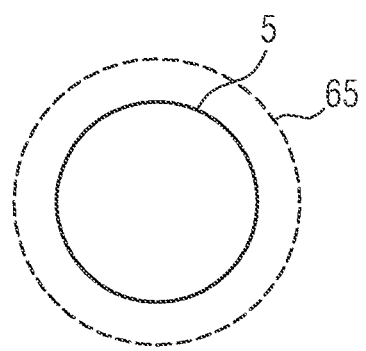
FIGS. 3A and 3B show exemplary top views of pin holes for sensor systems.

This is also illustrated in connection with FIG. 3. The situation of FIG. 3A corresponds to FIG. 2A. Thus, at the maximum distance corresponding to the fixed distance 62, the light spot 65 on the pin hole 5 is centered and is comparably small. A high proportion of the reflected laser radiation L can pass through the pin hole 5.

Figure 3B:
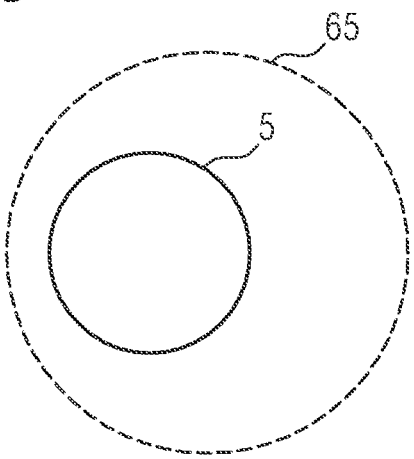

In the case of FIG. 2B, compare FIG. 3B, the spot 65 is comparably large and is located asymmetric to the pin hole 5. Hence, only a comparably small fraction of the laser radiation L reflected at the object 9 passes through the pin hole 5.

Thus, as for smaller target distances the sensor lens 32 is not moved away from the sensor 4 to keep the light in focus, the now not sharp image of the target spot grows with a smaller target distance. This means that, as mentioned above, the size 63 of the sharp image would stay roughly the same, for example, about 0.2 mm. The intensity of the light collected from the illuminated spot at the target 9 increases with the 1/distance to the square of the target as the target is overall more illuminated in mW/cm$^2$ at short distances than at larger distances. However, assuming constant ambient light level like sunlight, the respective brightness in mW/cm$^2$ of the sharp image of the ambient lit target stays the same. Its image only varies in size with its distance.

Assuming a large enough target in the worst case, this statement, same mW/cm$^2$ level at the sharp image location, stays true for the mW/cm$^2$ of the unfocussed ambient light from the target as well.

In conclusion, a sharp and, worst case not sharp, image of the object 9 will have the same mW/cm$^2$ brightness due to ambient light but an increased, with 1/distance$^2$, brightness from the infrared laser beam. Therefore, the challenge is twofold: The detector 4 needs to give a signal for the reflected laser pulse at maximum target distance and maximum ambient light, but the detector should not saturate under maximum ambient light conditions when the target is close to the detector, for example, at a distance of only 1 m. The saturation due to the infrared laser light should be kept at a minimum to keep the recovery time of the pixels of the detector short.

In order to accomplish these goals with a single-photon photo-multiplier multi-cell sensor, preferably the following applies: The pin hole 5 sits in the image plane for the maximum defined target distance, for example, 300 m. The pin hole 5 is not significantly larger than the projected image of the laser spot on the target 9, for example, about 0.2 mm in size. In this way the pin hole removes ambient light from the parts of the target outside the laser spot. When the optical axis 40 of the sensor unit 4 is different from the optical axis 20 of the light source 2, this causes a parallax angle for the sensor unit 4. The parallax causes the light spot of the target image to move away from the pin hole for target distances smaller than the fixed distance, thus smaller than, for example, 300 m.

The laser light going through the pin hole is then reduced by two effects for smaller target distances than the fixed distance: The just mentioned effect of parallax, and the slightly growing size of the beam at the pin hole, compare FIG. 3. The laser light passing through the pin hole 5, for example, at 1 m distance, is reduced by a factor of, for example, 5 due to the increased beam size. By choosing the distance between the sensor 4 and the light source 2 in the right way, the intensity can further be reduced by a factor of, for example, 5 due to the parallax effect.

However, for larger objects 9 ambient light as discussed above can still enter the sensor system 32, 4, 5 via the optical axis 40 and might not be suppressed. At its maximum, the ambient light level could be comparable to the intensity of the sharp image. However, the amount of photons passing the pin hole are limited by the pin hole size.

Figure 4:
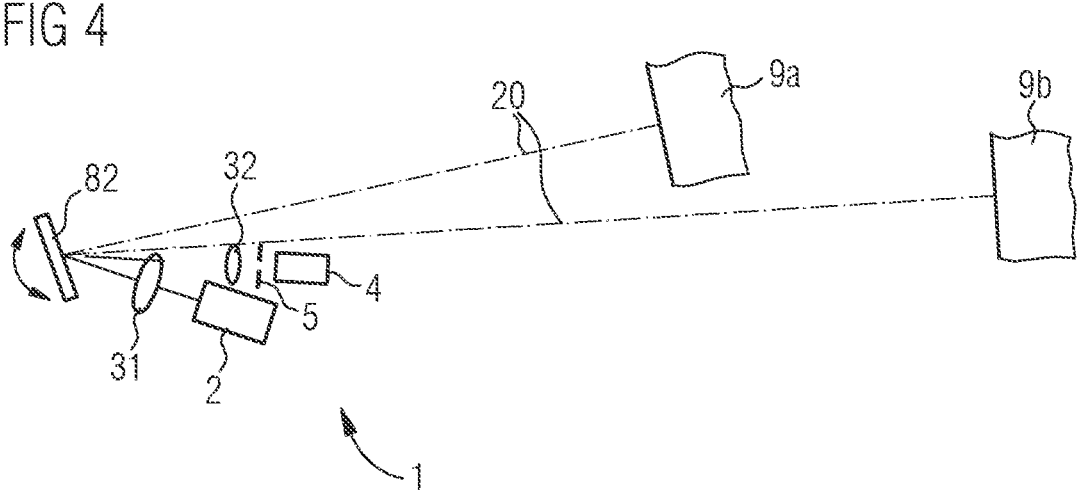

In FIG. 4 it is illustrated that the sensor system 1 further comprises a scanner unit 82. By means of the scanner unit 82, the direction of the optical axis 20 of the light source 2 is varied. For example, the scanner unit 82 is an MEMS movable mirror. Thus, different objects 9a, 9b at different locations and in particular at different distances to the sensor system 1 can be detected. The objects 9a, 9b are, for example, cars or pedestrians or other obstacles on or beside a street.

Figure 5:
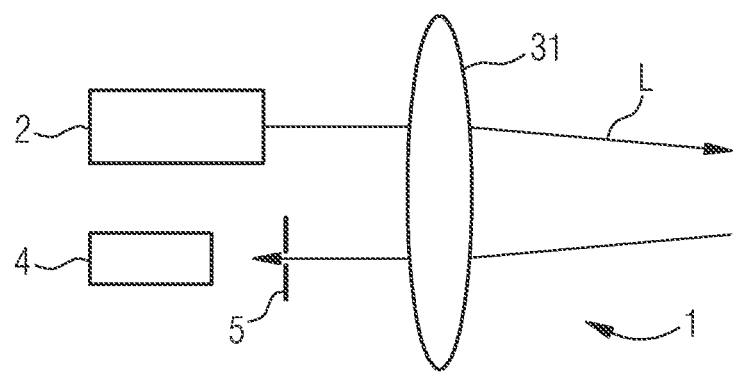

In the exemplary embodiments of FIGS. 1 to 4, there is in each case a first optical element 31 for the light source 2 and a second optical element 32 for the detector 4. Contrary to that, according to FIG. 5 there is a common optical element 31 for both the light source 2 and the detector 4. The same arrangement can be chosen in all the other exemplary embodiments.

Figure 6:
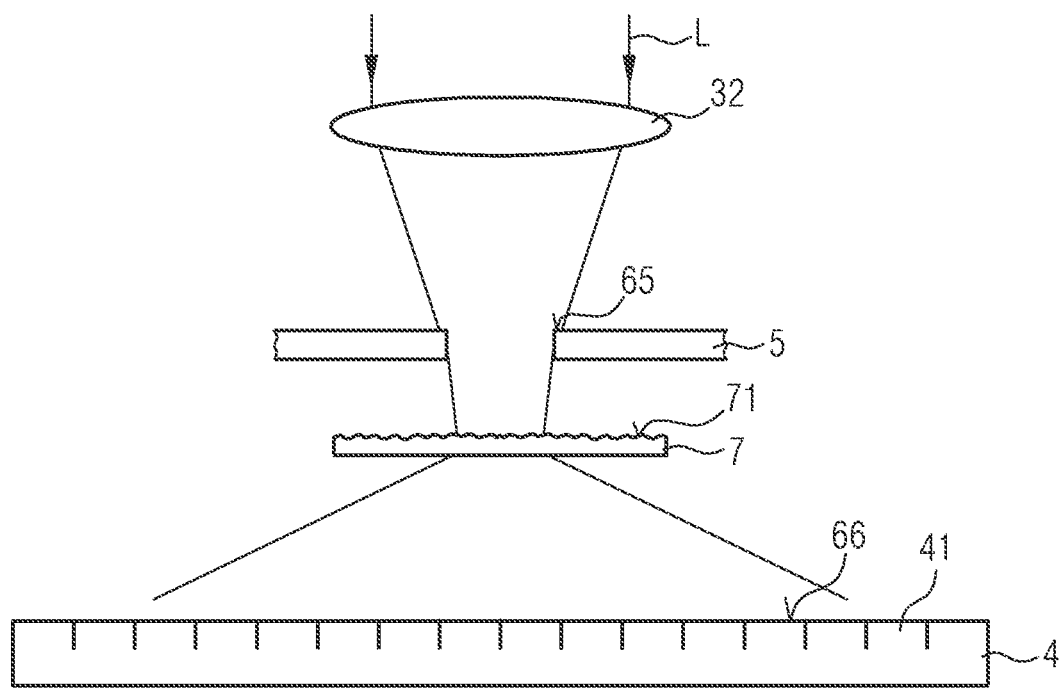

According to FIG. 6, again the diffusor 7 is between the pin hole 5 and the detector 4. In this case, the detector 4 has a plurality of pixels 41, the pixels 41 can also be referred to as cells. The diffusor 7 has a roughening 71 at a side facing the pin hole 5. As an option, the side of the diffusor 7 facing the detector 4 can be of planar fashion. There can be a small distance between the pin hole 5 and the diffusor 7. Due to the diffusor 7, a light spot 66 on the detector 4 covers a large number of the pixels 41 so that saturation of the detector 4 and its pixels 41 is avoided.

A transmissivity of the diffusor 9 is, for example, around 90%. The light spot 66 on the detector 4 has, for example, a diameter of around 5 mm. As an option, there can be an anti-reflective coating, not shown, on the side of the diffusor 7 facing the detector 4.

As in all the other exemplary embodiments, a focal length of the optical elements 31, 32 is in particular around 25 mm. A distance between the optical element 32 and the pin hole 5 is slightly larger than the focal length, for example, around 26 mm or 27 mm if the focal length is around 25 mm. A distance between the pin hole 5 and the detector 4 is, for example, around 10 mm. Preferably, the laser radiation L reflected at the fixed distance 62 is focused onto the pin hole 5 and not onto the detector 4.

Thus, the diffusor 7 is mounted under the pin hole 5 to spread the light over a larger area of the sensor 4, allowing more pixels 41 to participate and reducing the chance of sensor saturation by ambient light and/or laser light. Otherwise, the light may converge further underneath the pin hole 5 spreading the photons over even fewer detector cells 41.

Thus, an advantage of the sensor system 1 described herein is to limit the light from the target with a pin hole 5 and then spread it with a diffusor 7 to avoid saturation of all participating cells 41 of the single-photon multiplier 4. With the help of the parallax effect, the infrared laser light from objects 9 close by can further be reduced.

As an example, sunlight of 100 klux can be assumed and a 100% reflective target. A passband of a bandpass filter 81 ranges from 880 nm to 940 nm. Then, the maximum irradiance at the target from the sunlight within the optical bandpass filter range is assumed to be around 4.5 mW/cm$^2$. Further, it can be assumed that the same lens 31 is used for the light source 2 as well as for the detector 4. Further, it can be assumed that this lens 31 has a lens factor of 2, that is a focal length is 2 times its aperture.

Due to the optical system 31, a sharp picture of the target 9 in 300 m distance is projected onto the pin hole 5. Then, the irradiance at the pin hole 5 is about 280 µW/cm$^2$, corresponding to about $1.3 \times 10^{15}$ photons per cm$^2$ for the ambient light and 100% diffuse target reflectivity.

Further, in this example, the pin hole 5 has a diameter of 0.2 mm. Then, $4 \times 10^{11}$ photons make it through the pin hole 5 from the ambient light.

In this example, the light source 2 emits a 100 W laser in the near infrared. The optical element 31 produces a beam with a 1.5 mrad in divergence with 50% of the laser power in the beam. Then, with respective optical losses in the optical system, the average irradiance with laser radiation at the target of 4.3 mW/cm$^2$ is assumed at the fixed distance of, for example, 300 m, slightly smaller than the ambient light. Thus, around $3.8 \times 10^{11}$ photons/second reach the target 9 if the laser would irradiate in continuous wave mode.

Assuming a single-photon photo-multiplier with 10 µm×10 µm cells, 314 cells directly under the pin hole 5, a recovery time of 50 ns, a laser pulse length of 1 ns, a sensitivity at the laser wavelength of 950 nm of 3%, then 380 laser infrared photons make it through the pin hole 5, from which 11, corresponding to a sensitivity of 3%, would be detected. Assuming a 25% loss in the sensor optics 32, this number goes down to 9 photons, or 2 photons when a target reflectivity of 25% only is assumed.

For shorter distances, the ambient light level does not get higher, only the reflected infrared laser signal increases, which is a positive effect. From a target 9 at 1 m distance, the pin hole 5 reduces the laser photon count by a factor of about 5 and the parallax by a factor of 5, too. In total, 2800 photons are detected during 1 ns for 100% target reflectivity and no optical losses, or 2100 photons assuming 25% optical losses. Here, it makes sense to spread the photons with the diffusor 7 over a large amount of detector cells 41.

In the exemplary embodiment of FIG. 7, in each case there is an absorber layer 83 on top of the pixelated detector 4. According to FIG. 7A, the absorber layer 83 is a contiguous layer with a constant thickness completely covering the detector 4. According to 7B, the absorber layer 83 is limited to a central region of the detector 4 directly beyond the pin hole 5 and the diffusor 7. Thus, higher intensities in the central region can be compensated for.

Figure 7A:
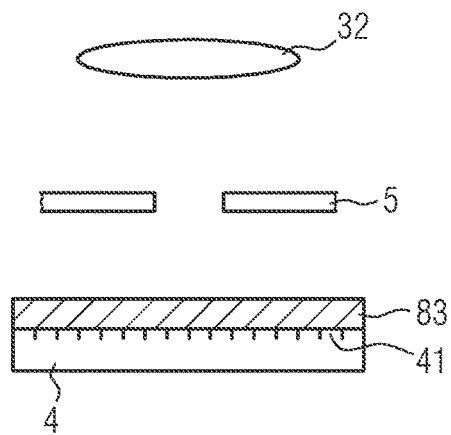
Figure 7B:
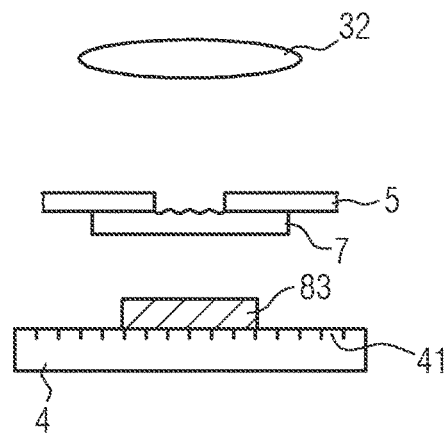
Figure 7C:
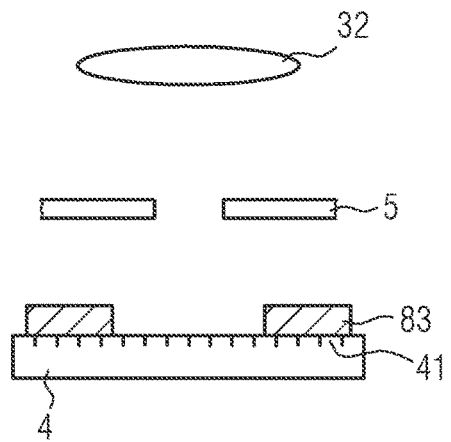
Figure 7D:
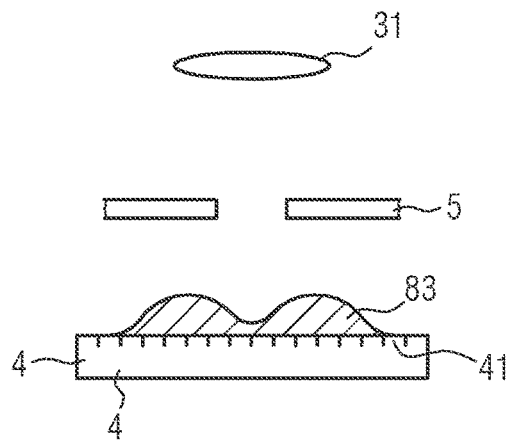

According to FIG. 7C, the absorber layer 83 is in the shape of a ring wherein the center region and an edge region of the detector 4 are both free of the absorber layer 83. The arrangement in FIG. 7D roughly corresponds to the arrangement in FIG. 7C but the absorber layer 83 has a varying thickness. By means of such absorber layers 83, the light level can be reduced to avoid saturation of the detector 4.

Figure 8:
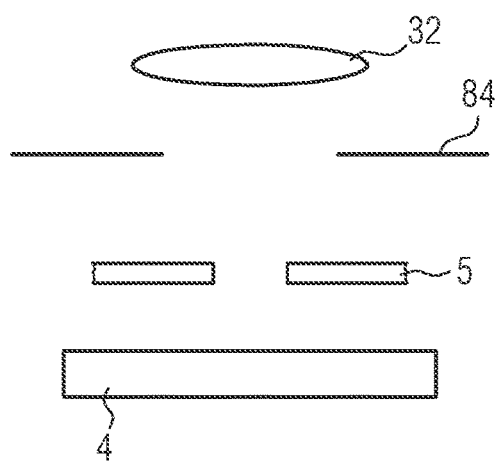

In FIG. 8 it is shown that there is a baffle 84 between the further optical element 32 and the pin hole 5. Stray light can be reduced with such a baffle 84.

Figure 9:
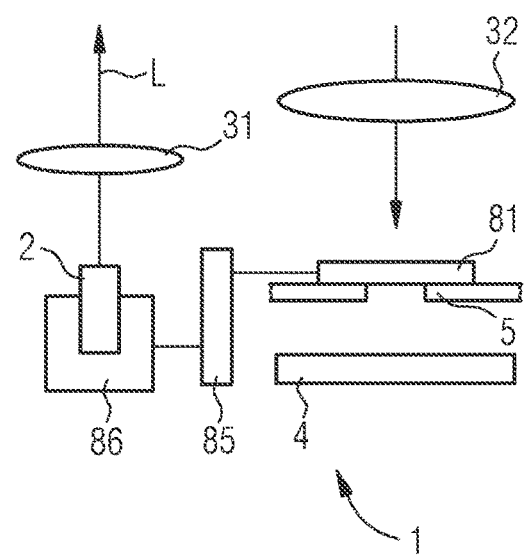

According to FIG. 9, there is a spectral filter 81 that is transmissive only to radiation in the wavelength range of the laser radiation L. As an option, there is a control unit 85 to adapt a passband of the spectral filter 81 to the actual wavelength of the laser radiation L.

As an alternative or in addition, there can be a temperature stabilizer 86 at the light source 2 in order to stabilize the wavelength of the laser radiation L. The temperature stabilizer 86 can be controlled by the control unit 85, too. The wavelength of the laser radiation L would otherwise significantly vary, depending on a temperature of the light source 2.

Figure 10A:
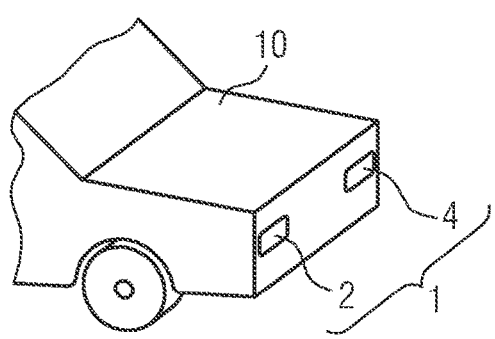
FIGS. 10A and 10B show perspective representations of vehicles comprising a sensor system.
Figure 10B:
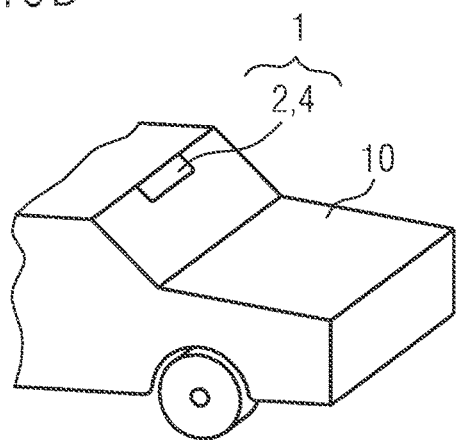

In FIG. 10 vehicles 10, in particular cars, are shown that comprise the sensor system 1 as explained in connection with the exemplary embodiments of FIGS. 1 to 9.

According to FIG. 10A, the light source 2 and the detector 4 are located at a comparably large distance to one another, for example, at different ends of a front side of the vehicle 10. Thus, a comparably large angle between the optical axes 20, 40 between the light source 2 and the detector 4 can be achieved.

Contrary to that, the sensor system 1 with the light source 2 and the detector 4 is located approximately at the same place, for example, in the middle at a top of the vehicle 10.

In short, the sensor system 1 described here allows the use of less expensive and more amplifying single-photon CMOS silicon-based photo-multipliers which can be operated at voltages of less than 30 V instead of the required up to 200 V for avalanche photodiodes. A sensitivity in the measurements of distances, in particular in ranging applications for cars, can thus be improved.

The invention described here is not restricted by the description given with reference to the exemplary embodiments. Rather, the invention encompasses any novel feature and any combination of features, including in particular any combination of features in the claims, even if this feature or this combination is not itself explicitly indicated in the claims or exemplary embodiments.

What is claimed is:

1. A sensor system comprising:
a light source configured to emit laser radiation;
a first optical element configured to image the laser radiation to at least one image point at a fixed distance in an optical far field of the sensor system, wherein at the image point a beam diameter of the laser radiation is at a minimum;
a detector configured to detect a proportion of the laser radiation reflected back at at least one object illuminated by the laser radiation;
a pin hole located in front of the detector, wherein a diameter of the pin hole corresponds to a size of the image point within a factor of two;
a second optical element, wherein the image point is permanently imaged onto at least one of the detector or the pin hole by the first optical element or the second optical element; and
a diffusor configured to scatter the laser radiation,
wherein the diffusor is located between the detector and the pin hole,
wherein the diffusor is configured to increase an illumination spot on the detector to at least 5 times the diameter of the pin hole,
wherein the diffusor is of a material transparent to the laser radiation and has a roughening at a side facing the pin hole, and
wherein the detector is configured to measure a time of flight of the reflected laser radiation.

2. The sensor system of claim 1, wherein the sensor system is a rangefinder, and wherein an angle between an optical axis of the light source and an optical axis of the detector is between 0.3 mrad and 8 mrad inclusive so that the reflected laser radiation is imaged off-axis onto at least one of the detector or the pin hole when the object is nearer to the sensor system than the fixed distance.

3. The sensor system of claim 1,
wherein the detector is a single-photon CMOS silicon-based photo-multiplier with a plurality of pixels,
wherein a distance between the pin hole and the detector amounts to at most 0.1% of the fixed distance,
wherein the fixed distance is between 100 m and 600 m inclusive, and
wherein a peak wavelength of the laser radiation is between 880 nm and 940 nm inclusive.

4. The sensor system of claim 1, further comprising a spectral filter located in front of the detector, wherein a pass band of the filter is adapted to a wavelength range of the laser radiation.

5. The sensor system of claim 4,
wherein a spectral width of the pass band amounts to at most twice of a spectral width of the laser radiation, and
wherein the laser radiation is spectrally stabilized or the pass band is to be tuned to a spectral position of the laser radiation.

6. The sensor system of claim 1, wherein a focal length of the first optical element is between $2\times10^{-5}$ and $5\times10^{-4}$ inclusive of the fixed distance.

7. The sensor system of claim 1, further comprising a scanner unit, wherein the scanner unit is configured to scan a solid angle range with the laser radiation which is a pulsed radiation, and wherein the fixed distance is not changed by the scanner unit.

8. The sensor system of claim 1, further comprising an absorber layer arranged on the detector, wherein the absorber layer is configured to absorb a part of the laser radiation before reaching the detector so that saturation of the detector is prevented.

9. The sensor system of claim 8, wherein the absorber layer is limited to a central region of the detector, the central region being located under the pin hole, along an optical axis of the detector.

10. The sensor system of claim 1, further comprising a baffle located between the pin hole and at least one of the first optical element or the second optical element, wherein the baffle is configured to reduce stray light, and wherein an opening in the baffle to be passed by the reflected laser radiation has a diameter which is between the diameter of the pin hole and five times the diameter of the pin hole inclusive.

11. The sensor system of claim 1, wherein the sensor system is designed to measure a distance to objects between 0.1% and 100% inclusive of the fixed distance.

12. A method for operating the sensor system of claim 1, the method comprising:
    measuring a distance between the sensor system and the at least one object,
    wherein the light source emits the laser radiation,
    wherein the first optical element images the laser radiation to the at least one image point at the fixed distance in the optical far field,
    wherein the detector detects the proportion of the laser radiation reflected back at the at least one object illuminated by the laser radiation, a position of the object is between the sensor system and the fixed distance,
    wherein the image point at the fixed distance is permanently imaged onto at least one of the detector and the pin hole by the first optical element or by the second optical element, and
    wherein the distance to the object is measured by a time of flight measurement of the reflected laser radiation.

13. A sensor system comprising:
    a light source configured to emit laser radiation;
    a first optical element configured to image the laser radiation to at least one image point at a fixed distance in an optical far field of the sensor system, wherein at the image point a beam diameter of the laser radiation is at a minimum;
    a detector configured to detect a proportion of the laser radiation reflected back at at least one object illuminated by the laser radiation;
    a pin hole located in front of the detector, wherein a diameter of the pin hole corresponds to a size of the image point within a factor of two;
    a second optical element, wherein the image point is permanently imaged onto at least one of the detector or the pin hole by the first optical element or the second optical element; and
    a spectral filter located in front of the detector, wherein a pass band of the filter is adapted to a wavelength range of the laser radiation,
    wherein the laser radiation is spectrally temperature stabilized and/or the pass band is to be tuned to a spectral position.

14. The sensor system of claim 13, wherein the sensor system is a rangefinder, and wherein an angle between an optical axis of the light source and an optical axis of the detector is between 0.3 mrad and 8 mrad inclusive so that the reflected laser radiation is imaged off-axis onto at least one of the detector or the pin hole when the object is nearer to the sensor system than the fixed distance.

15. The sensor system of claim 13,
    wherein the detector is a single-photon CMOS silicon-based photo-multiplier with a plurality of pixels,
    wherein a distance between the pin hole and the detector amounts to at most 0.1% of the fixed distance,
    wherein the fixed distance is between 100 m and 600 m inclusive, and
    wherein a peak wavelength of the laser radiation is between 880 nm and 940 nm inclusive.

16. The sensor system of claim 13, wherein a focal length of the first optical element is between $2 \times 10^{-5}$ and $5 \times 10^{-4}$ inclusive of the fixed distance.

17. The sensor system of claim 13, further comprising a scanner unit, wherein the scanner unit is configured to scan a solid angle range with the laser radiation which is a pulsed radiation, and wherein the fixed distance is not changed by the scanner unit.

18. A sensor system comprising:
    a light source configured to emit laser radiation;
    a first optical element configured to image the laser radiation to at least one image point at a fixed distance in an optical far field of the sensor system, wherein at the image point a beam diameter of the laser radiation is at a minimum;
    a detector configured to detect a proportion of the laser radiation reflected back at at least one object illuminated by the laser radiation;
    a pin hole located in front of the detector, wherein a diameter of the pin hole corresponds to a size of the image point within a factor of two;
    a second optical element, wherein the image point is permanently imaged onto at least one of the detector or the pin hole by the first optical element or the second optical element; and
    an absorber layer arranged on the detector,
    wherein the absorber layer is configured to absorb a part of the laser radiation before reaching the detector so that saturation of the detector is prevented,
    wherein the absorber layer has a shape of a ring,
    wherein a centre region and an edge region of the detector are both free of the absorber layer and/or the absorber layer has varying thickness.

19. The sensor system of claim 18, wherein the absorber layer is limited to a central region of the detector, the central region being located under the pin hole, along an optical axis of the detector.

20. The sensor system of claim 18, wherein the sensor system is a rangefinder, and wherein an angle between an optical axis of the light source and an optical axis of the detector is between 0.3 mrad and 8 mrad inclusive so that the reflected laser radiation is imaged off-axis onto at least one of the detector or the pin hole when the object is nearer to the sensor system than the fixed distance.

* * * * *